(12) United States Patent
Wadsworth

(10) Patent No.: US 10,810,988 B2
(45) Date of Patent: Oct. 20, 2020

(54) ACOUSTIC PANEL EMPLOYING ROUNDED PARTICLES IN SEPTUM LAYER AND SYSTEM AND METHOD FOR MAKING SAME

(71) Applicant: SPIRIT AEROSYSTEMS, INC., Wichita, KS (US)

(72) Inventor: Mark Anthony Wadsworth, Sedan, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 377 days.

(21) Appl. No.: 15/828,769

(22) Filed: Dec. 1, 2017

(65) Prior Publication Data

US 2019/0172438 A1 Jun. 6, 2019

(51) Int. Cl.
*G10K 11/172* (2006.01)
*E04B 1/82* (2006.01)
*F02C 7/045* (2006.01)
*F02K 1/82* (2006.01)

(52) U.S. Cl.
CPC .............. *G10K 11/172* (2013.01); *E04B 1/82* (2013.01); *F02C 7/045* (2013.01); *F02K 1/827* (2013.01); *F05D 2250/241* (2013.01); *F05D 2260/96* (2013.01)

(58) Field of Classification Search
CPC ......... G10K 11/172; E04B 1/82; F02C 7/045; F02K 1/827; F05D 2250/241; F05D 2260/96
USPC ....................................................... 181/286
See application file for complete search history.

(56) References Cited

U.S. PATENT DOCUMENTS

| | | | | | |
|---|---|---|---|---|---|
| 3,985,198 A | * | 10/1976 | Kurtze | ...................... | B32B 3/12 181/286 |
| 4,621,022 A | * | 11/1986 | Kohaut | ................... | B65D 81/09 428/397 |
| 5,114,630 A | * | 5/1992 | Newman | .................. | C06B 21/00 102/292 |
| 5,484,970 A | * | 1/1996 | Suzuki | ...................... | E04B 1/84 181/286 |
| 5,545,450 A | * | 8/1996 | Andersen | .............. | B01F 3/1214 428/34.5 |
| 5,658,603 A | * | 8/1997 | Andersen | .............. | B01F 3/1214 425/532 |
| 5,658,656 A | * | 8/1997 | Whitney | ............... | E04B 1/8218 181/198 |

(Continued)

*Primary Examiner* — Forrest M Phillips
(74) *Attorney, Agent, or Firm* — Hovey Williams LLP

(57) ABSTRACT

An acoustic panel for attenuating sound, and a system and method for making the acoustic panel. The acoustic panel employs rounded particles which are introduced into the cells of a core and fixed at a particular depth to form a septum layer providing substantially linear acoustic resistance to sound waves entering the cell. The particles may be between 100 microns and 700 microns in diameter, may be solid or hollow, may have smooth or textured surfaces, and/or may be made of syntactic foam or glass or ceramic. The system includes a positioning mechanism for positioning the particles at the particular depth, metering and gating mechanisms for introducing a metered amount of the particles into each cell, and a vibratory base for vibrating the particles to better pack them. Once the particles are in the cells, the septum layer is fixed, and the positioning mechanism is removed.

16 Claims, 5 Drawing Sheets

(56) References Cited

U.S. PATENT DOCUMENTS

| | | | | |
|---|---|---|---|---|
| 5,705,239 A | * | 1/1998 | Andersen | B28B 23/0087 |
| | | | | 428/34.5 |
| 5,744,763 A | * | 4/1998 | Iwasa | B29C 43/203 |
| | | | | 181/286 |
| 6,085,865 A | * | 7/2000 | Delverdier | B32B 3/12 |
| | | | | 181/286 |
| 6,347,934 B1 | * | 2/2002 | Andersen | B29C 31/063 |
| | | | | 425/557 |
| 6,596,389 B1 | * | 7/2003 | Hallett | C04B 26/02 |
| | | | | 181/284 |
| 6,755,997 B2 | * | 6/2004 | Gebreselassie | B29C 43/203 |
| | | | | 264/162 |
| 7,600,609 B2 | * | 10/2009 | Nakamura | E04B 1/86 |
| | | | | 181/286 |
| 7,770,691 B2 | * | 8/2010 | Schabel, Jr. | B60R 13/08 |
| | | | | 181/259 |

* cited by examiner

ACOUSTIC PANEL EMPLOYING ROUNDED PARTICLES IN SEPTUM LAYER AND SYSTEM AND METHOD FOR MAKING SAME

FIELD

The present invention relates to acoustic panels and systems and methods for making them, and more particularly, embodiments concern an acoustic panel employing spheres or other rounded particles which are poured or otherwise introduced into the cells of a core and fixed to form a septum, and a system and method of making the acoustic panel.

BACKGROUND

It is often desirable to attenuate noise resulting from, e.g., the operation of aircraft engines. For example, an aircraft nacelle, which houses an aircraft engine, employs acoustic panels having a honeycomb core between a perforated first skin and a non-perforated second skin. The honeycomb core includes a plurality of cells functioning as Helmholtz resonator chambers for attenuating noise. The noise most attenuated is centered around a specific frequency which is determined by the dimensions of the honeycomb core cells, the perforated skin dimensions, and other factors. In order to attenuate noise over a wider frequency band, the honeycomb core cells are sometimes divided into multiple chambers by means of an acoustic resistance layer called a "septum." This arrangement forms a double degree of freedom (DDOF) acoustic panel. The specific frequency range attenuated by the DDOF acoustic panel is determined by the dimensions of each chamber, which is determined by a position of a septum layer in each cell.

It is desirable to use a septum layer having small holes, tortuous paths, and good entrance and exit conditions which provide smooth flow geometries in both directions. In particular, it is desirable for the septum layer to have low non-linearity (ideally 1.0, but practically less than 2.0 or so), such that the velocity of the air (i.e., the pressure of the sound waves) does not change the resistance. Specifically, the non-linearity factor is defined as flow resistance in Rayls at an acoustic particle velocity of 200 cm/sec divided by flow resistance at an acoustic particle velocity of 20 cm/sec. Certain woven meshes, such as reverse Dutch weave fabric, have acceptable non-linearity factors. In particular, openings in the woven mesh of these fabrics have smooth entrance ("inlet") and exit ("diffuser") geometries which promote flow at both low and high velocities. However, working with such a fabric, including mechanically inserting and positioning the fabric in each cell, can be time-consuming. One alternative is to use laser-drilled films, but these have square entrances which can cause separation at high velocities, which reduces the effective diameter and creates much higher backpressure.

This background discussion is intended to provide information related to the present invention which is not necessarily prior art.

SUMMARY

Embodiments of the present invention address the above-described and other problems by providing an acoustic panel employing spheres or other rounded particles which are poured or otherwise introduced into the cells of a core and bonded, sintered, or otherwise fixed together to form a septum, and a system and method of making the acoustic panel.

In a first embodiment of the present invention, an acoustic panel is provided for attenuating sound. The acoustic panel may comprise a core having a plurality of cells, and a septum layer including a plurality of rounded particles located at a particular depth in each cell, and providing substantially linear acoustic resistance to a sound wave entering the cell. Various implementations of the first embodiment may additionally or alternatively include any one or more of the following features. The rounded particles may be between 100 microns and 700 microns in diameter. The rounded particles may be solid or hollow, may have smooth or textured surfaces, and/or may be made of syntactic foam or glass or ceramic. The rounded particles may be secured by an adhesive at the particular depth.

In a second embodiment, a system is provided for adding a septum layer to a plurality of cells of a core of an acoustic panel for attenuating sound, wherein the septum layer includes a plurality of rounded particles. The system may comprise positioning, metering, and gating mechanisms, and a vibratory base. The positioning mechanism may be configured to be inserted into and positioned at a particular depth in each cell. The metering mechanism may be configured to introduce a metered amount of the rounded particles into each cell above the positioning mechanism. The gating mechanism may be configured to control the introduction of the rounded particles from the metering mechanism into each cell. The vibratory base may be configured to vibrate the rounded particles in each cell in order to pack them more tightly. Once the rounded particles are packed in each cell, the rounded particles may be fixed to adhere to each other and to the cells at the particular depth, and the positioning mechanism may be removed.

Various implementations of the second embodiment may additionally or alternatively include any one or more of the following features. The rounded particles may be coated to reduce agglomeration until the rounded particles have been introduced into the cells. The rounded particles may be mixed with an adhesive, a flow control filler, and/or a solvent which facilitates introduction of the rounded particles into the cells and then evaporates. The positioning mechanism may include a platform configured to support the rounded particles at the particular depth. The platform may have a chamfered edge which is adjacent to a wall of the cell when the platform is inserted into the cell, and wherein the chamfered edge results in a thicker septum layer adhering to the wall of the cell. The platform may be made of a wax material which is melted to remove the positioning mechanism from the cell. The positioning mechanism may include a stem configured to support the platform. The metering mechanism may include a plate having a plurality of holes, with each hole being alignable with a respective cell, such that the rounded particles placed in the holes are introduced into the respective cells. The gating mechanism may include a planar sheet selectively interposable between the holes of the metering mechanism and the cells, such that withdrawing the sheet allows the rounded particles in the holes to move into the respective cells.

In a third embodiment, a method is provided for adding a septum layer to a plurality of cells of a core of an acoustic panel for attenuating sound, wherein the septum layer includes a plurality of rounded particles. The method may comprise the following steps. A particular depth may be established in each cell for the septum layer. A metered amount of the rounded particles may be positioned for introduction into each cell at the particular depth. Introduction of the rounded particles into each cell may be controlled. The rounded particles in each cell may be vibrated in order to pack them more tightly. The rounded particles may be fixed to adhere to each other and to the cells at the particular depth. An implementation of the third embodiment may additionally include mixing the rounded particles with an adhesive, a flow control filler, and/or a solvent which facilitates the introduction of the rounded particles into the cells and then evaporates.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
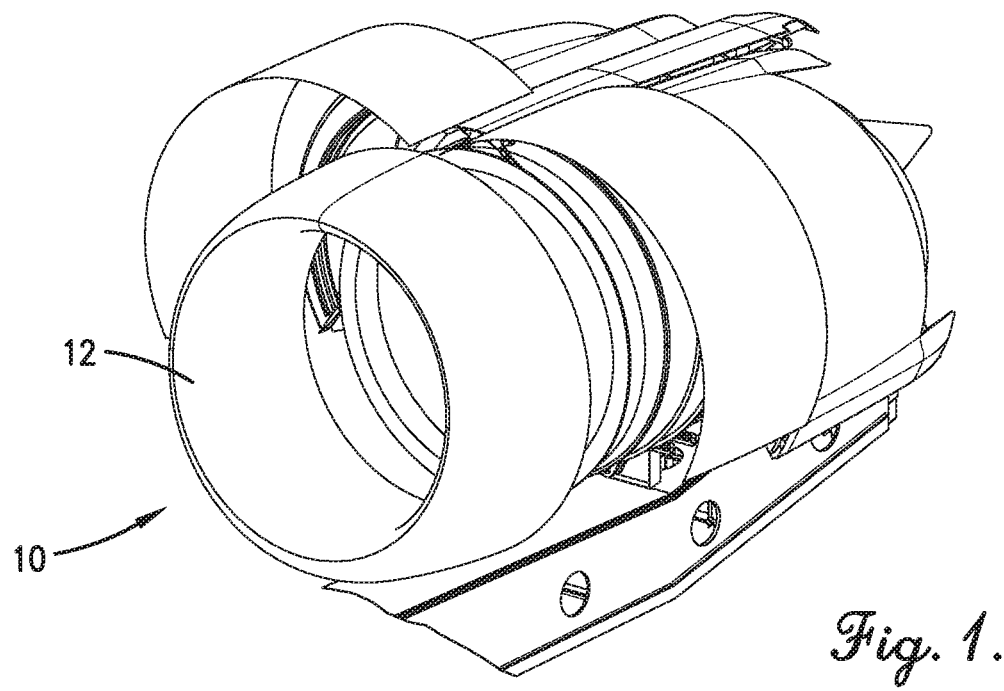
FIG. 1 is a fragmentary perspective view of an exemplary structure (i.e., an engine nacelle of an aircraft) employing an acoustic panel.
Figure 2:
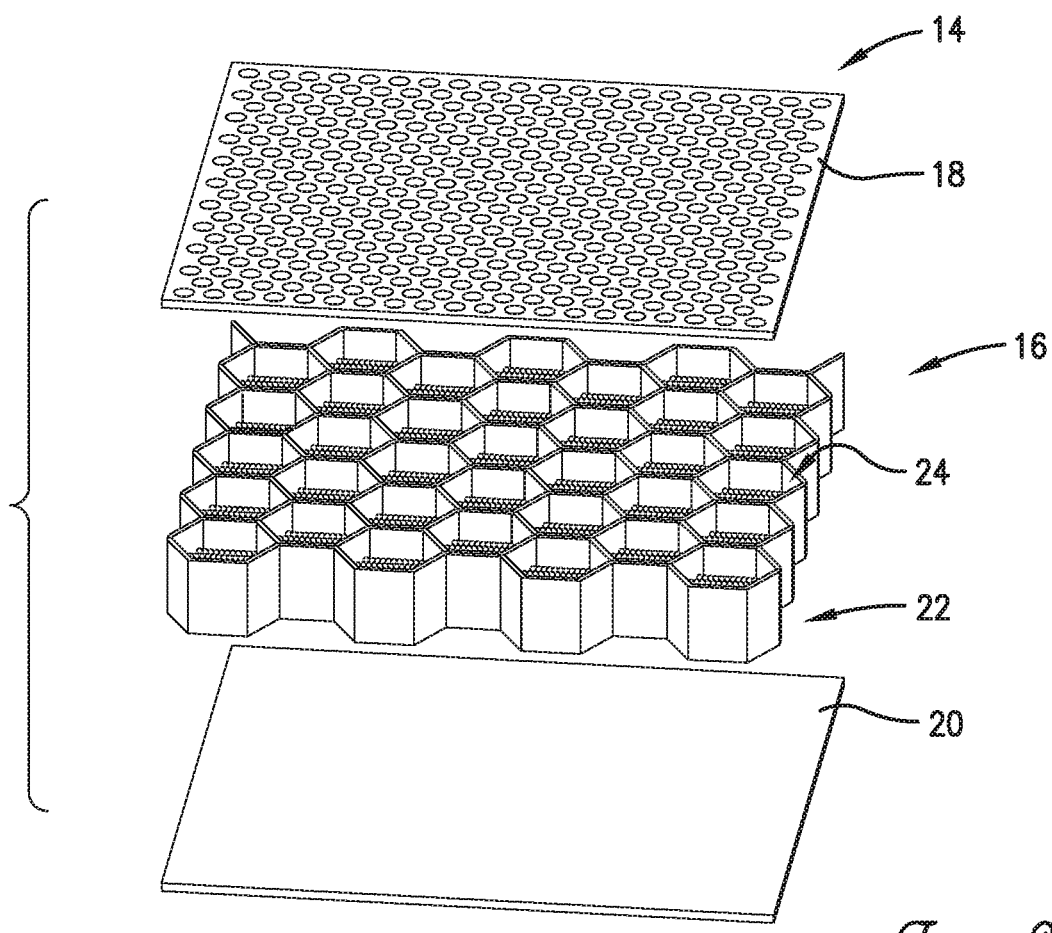
FIG. 2 is a fragmentary, exploded, isometric view of an exemplary acoustic panel.

Referring to FIGS. 1 and 2, a structure 10, in this case an exemplary engine nacelle of an aircraft, may incorporate acoustic panels 12 to attenuate noise. An exemplary acoustic panel 14 may include a core 16 interposed between a perforated front skin 18 and a non-perforated back skin 20. The core 16 may include a plurality of cells 22 functioning as Helmholtz resonator chambers to attenuate a specific frequency or range of frequencies of noise. The specific frequency or range of frequencies is determined by the dimensions of each chamber, which is determined by a position of a septum layer 24 in each cell 22.

Figure 3:
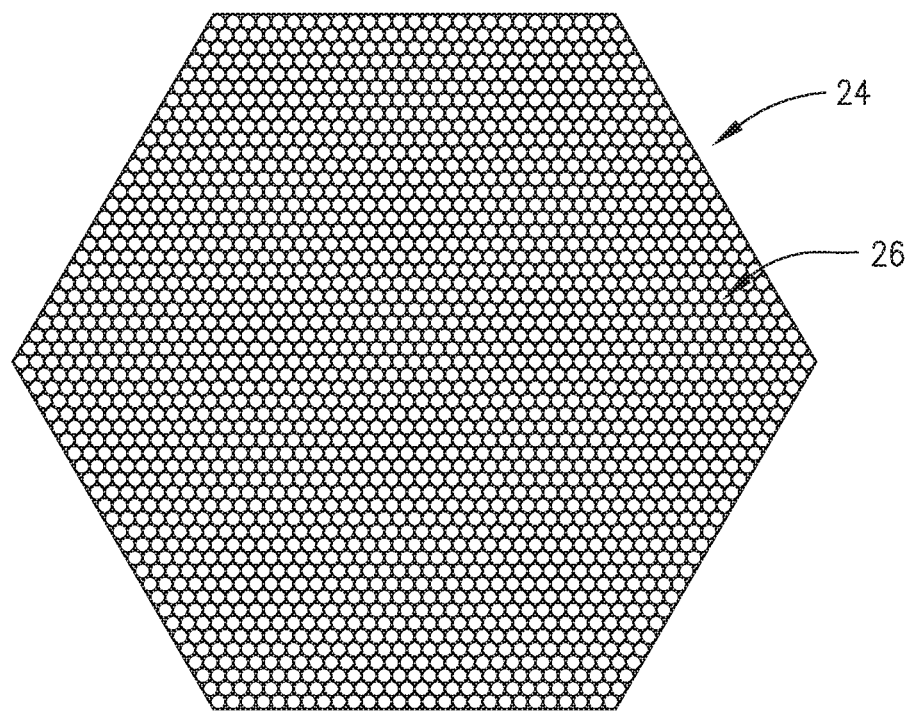
FIG. 3 is a plan view of an embodiment of a septum layer in a cell of a core of the acoustic panel of FIG. 2, wherein the septum layer comprises a plurality of rounded particles.
Figure 4:
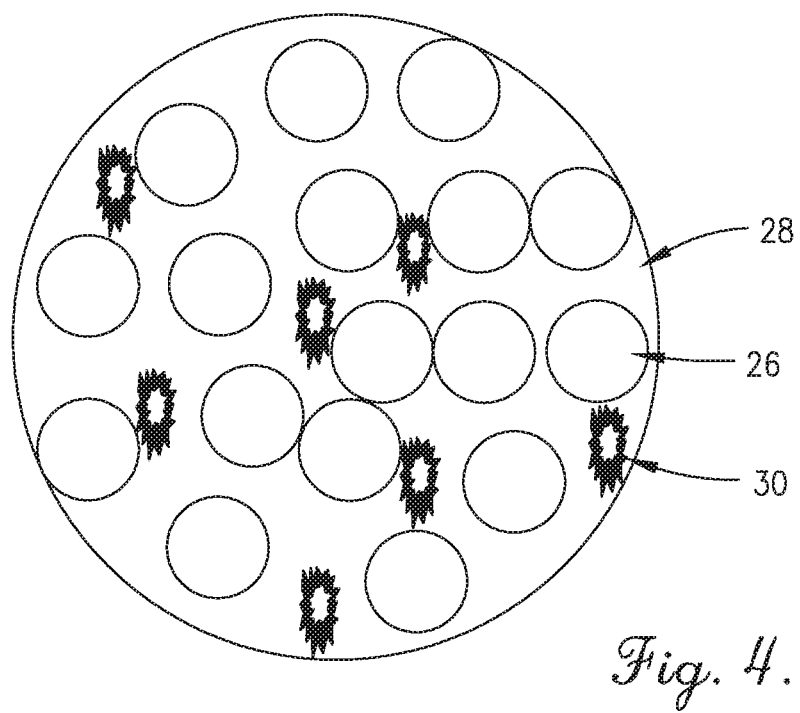
FIG. 4 is a plan view of a portion of the septum layer of FIG. 3, wherein the portion has been magnified to show the rounded particles and an adhesive mixture for securing the rounded particles in the cell.

Broadly characterized, embodiments of the present invention concern an acoustic panel employing spheres or other rounded particles which are poured or otherwise introduced into the cells 22 of the core 16 to and bonded, sintered, or otherwise fixed to form the septum layer 24, and a system and method for making the acoustic panel. Referring also to FIGS. 3 and 4, the rounded particles 26 take the place of the fibers in prior art woven meshes and the holes in prior art films. The rounded particles 26 may be poured into the cells 22, much like a fluid, rather that mechanically inserted, and then bonded to each other and to the walls of the cells to form the porous septum layer 24 providing substantially linear resistance properties similar to a woven mesh. It will be understood by one with ordinary skill in the art that perfect linear resistance is not practically achievable. In that light, the septum layer 24 is characterized herein as providing "substantially" linear resistance, which means a relatively low non-linearity of less than 2.0, similar to what is achievable with woven mesh.

Air entering the septum layer 24 may be smoothly accelerated as it follows the surfaces of the rounded particles 26. At the gap between adjacent rounded particles 26 the velocity of the air may be the highest, and most of the backpressure, or flow resistance, may be generated. However, because the path of the air to this point is smooth and converging, the pressure drop may not increase with flow velocity as fast as a restriction made with square entrance conditions (such as occurs with laser drilling). The linear relationship between the pressure drop and the flow velocity can be seen in the Kozeny-Carman equation. Although this equation is only applicable at low Reynolds numbers it is pertinent to acoustic applications because both the diameters of the rounded particles 26 and the velocities of the air are low, and even at higher Reynolds numbers the more complex Ergun equation predicts a largely linear response. Typically, flow through an orifice is inversely proportional to the square root of the pressure differential, which results in a higher non-linearity factor in its acoustic response.

The rounded particles 26 may be homogenous or heterogeneous with regard to size, structure, shape, and/or material. The rounded particles 26 may be spherical, ellipsoid, or otherwise generally or at least sufficiently round to achieve their function as described herein. The rounded particles 26 may be approximately between 100 microns and 700 microns, or approximately between 250 microns (or 0.01 inch) and 500 microns (or 0.02 inch), in diameter. Larger rounded particles may require more layers and therefore result in a thicker septum layer 24, while smaller rounded particles may require fewer layers and therefore result in a thinner septum layer 24. Two or more different sizes of rounded particles may be used; however, different sized rounded particles may pack together more tightly and result in a higher resistance than if a single size of sphere is used. The rounded particles 26 may be solid or hollow (e.g., microballoons). Solid rounded particles may be homogenous or may have a lower density core and a higher strength shell. The rounded particles 26 may have smooth or textured surfaces. Texturing may be mitigated or eliminated by the adhesive applied to the rounded particles 26, but whether or not this occurs may depend on such factors as the size of the rounded particles, the nature of the texturing, and/or the nature of the adhesive.

In some implementations, the rounded particles 26 may be made of syntactic foam or glass or ceramic. Syntactic foam rounded particles may be made of resin and lightweight filler, and may be easily manufactured in-house to specific requirements. For example, blanks may be cut from stock material, and then the blanks may be heated and tumbled to produce the desired round shape. A separate adhesive may not be required if the fixing process results in the rounded particles sufficiently adhering to each other and to the walls of the cells, though a coating may be required to reduce agglomeration until the rounded particles have been introduced into the cells. Glass or ceramic rounded particles may be readily available in a wide range of sizes. These rounded particles may need to be coated with adhesive, though agglomeration may be avoided by using a room temperature solid adhesive. In one implementation, the rounded particles may be or may include the shells of diatoms or other biological organisms, which may be artificially selected or engineered to provide the desired round structures having the desired characteristics.

The rounded particles 26 may be mixed with an adhesive 28, such as an epoxy resin. The mixture may include a flow control filler 30, such as a fumed silica or talc. Additionally or alternatively, the mixture may include a solvent to facilitate easier flowage of the rounded particles 26 into the cells 22, and the solvent may evaporate after the rounded particles 26 are introduced into the cells 22.

Figure 5:
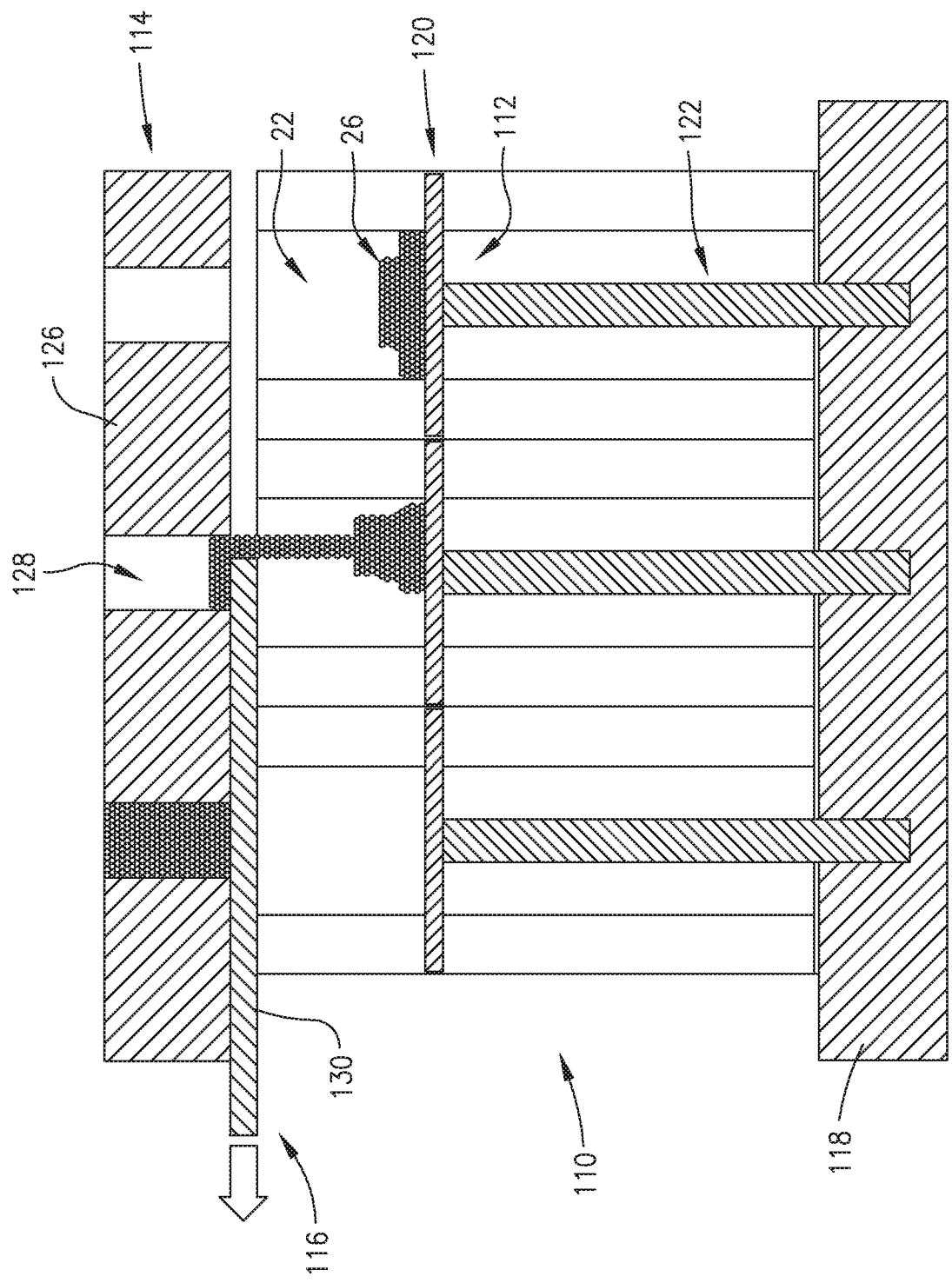
FIG. 5 is a fragmentary, cross-sectional, side elevation view of an embodiment of a system for making the septum layer of FIG. 3.
Figure 6:
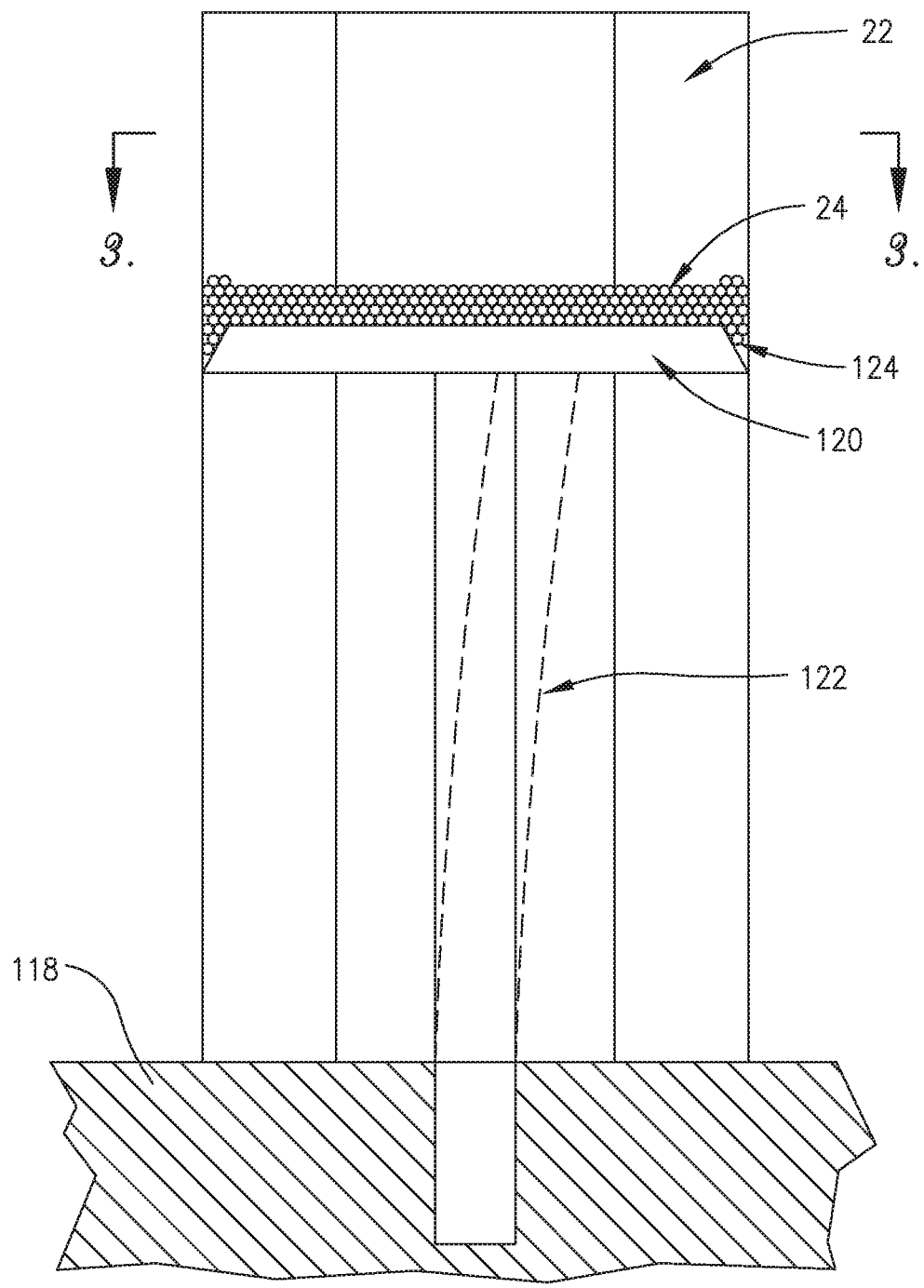
FIG. 6 is a fragmentary, cross-sectional, side elevation view of a portion of the system of FIG. 5.

The septum layer 24 should be accurately positioned at a particular depth in each cell 22 in order to have the desired effect. Referring to FIGS. 5 and 6, an embodiment of a system 110 for inserting the rounded particles 26 into the cells 22 to make the septum layer 24 may comprise a positioning mechanism 112; a metering mechanism 114; a gating mechanism 116; and a vibratory base 118. The positioning mechanism 112 may be configured to accurately control the depth of insertion of the rounded particles 26 into each cell 22. The positioning mechanism 112 may take the form of a platform configured to be inserted into a cell 22 to a pre-determined depth and to support the unfixed rounded particles 26 at that depth, and to be withdrawn from the cell 22 once the rounded particles 26 are fixed and the septum layer 24 is self-supporting. In one implementation, the positioning mechanism 112 may take the form of a platform 120 mounted on a stem 122. The platform 120 may fit sufficiently closely in the cell 22 to prevent the rounded particles 26 from fitting between the platform 120 and the wall of the cell 22, and may have a chamfered edge 124 both to facilitate insertion into the cell 22 and to provide an increased thickness of the rounded particles 26 adjacent to the wall of the cell 22 in order to increase the bond area with the wall. The stem 122 may be sufficiently flexible to allow the platform 120 to move in-plane by an amount sufficient to accommodate variability in the locations of the cells 22. In another implementation, the stem may be eliminated by elongating the platform to achieve the same function. In another implementation, the platform may take the form of a layer of wax which supports the rounded particles during construction and is thereafter removed by melting.

The metering mechanism 114 may be configured to introduce a metered amount (whether by weight, volume, or quantity) of rounded particles 26 to each cell 22 above the platform 120 of the positioning mechanism 112. In one implementation, the metering mechanism 114 may take the form of a plate 126 having a plurality of holes 128 which are spaced apart and otherwise corresponding to and alignable with the cells 22. In one implementation, each such hole 128 may have the same volume as the septum layer 24, so that the hole 128 can be filled with rounded particles 26, using vibration to ensure proper packing, and then screed to level the top. Once the holes 128 are loaded, the plate 126 may be positioned to align each hole 128 over a respective cell 22.

The gating mechanism 116 may be configured to control the introduction of the rounded particles 26 from the metering mechanism 114 into the cells 22. In one implementation, the gating mechanism 116 may take the form of a planar sheet 130 interposed between the holes 128 and the cells 22 and moveable to allow the contents of each hole 128 to flow into a respective cell 22.

The vibratory base 118 may be configured to vibrate the rounded particles 26 in the metering holes 128 and/or in the cells 22 in order to achieve tighter packing. In one implementation, the vibratory base 118 may apply vibration to the cells 22 in order to achieve a hexagonal close pack.

Once the rounded particles 26 have been introduced into the cells 22, the core 16, along with some or all of the system 110 (e.g., the positioning mechanism 112 which may be needed to support the rounded particles 26 until fixing is complete). For example, the assembly may be moved to an oven or other fixing mechanism where the rounded particles 26 and/or the adhesive 28 coating the rounded particles 26 may be fixed. The surface tension of the adhesive 28 may wet the wall of the cell 22 and bond adjacent rounded particles 26 to each other, resulting in a porous acoustic septum with linear flow resistance properties.

Figure 7:
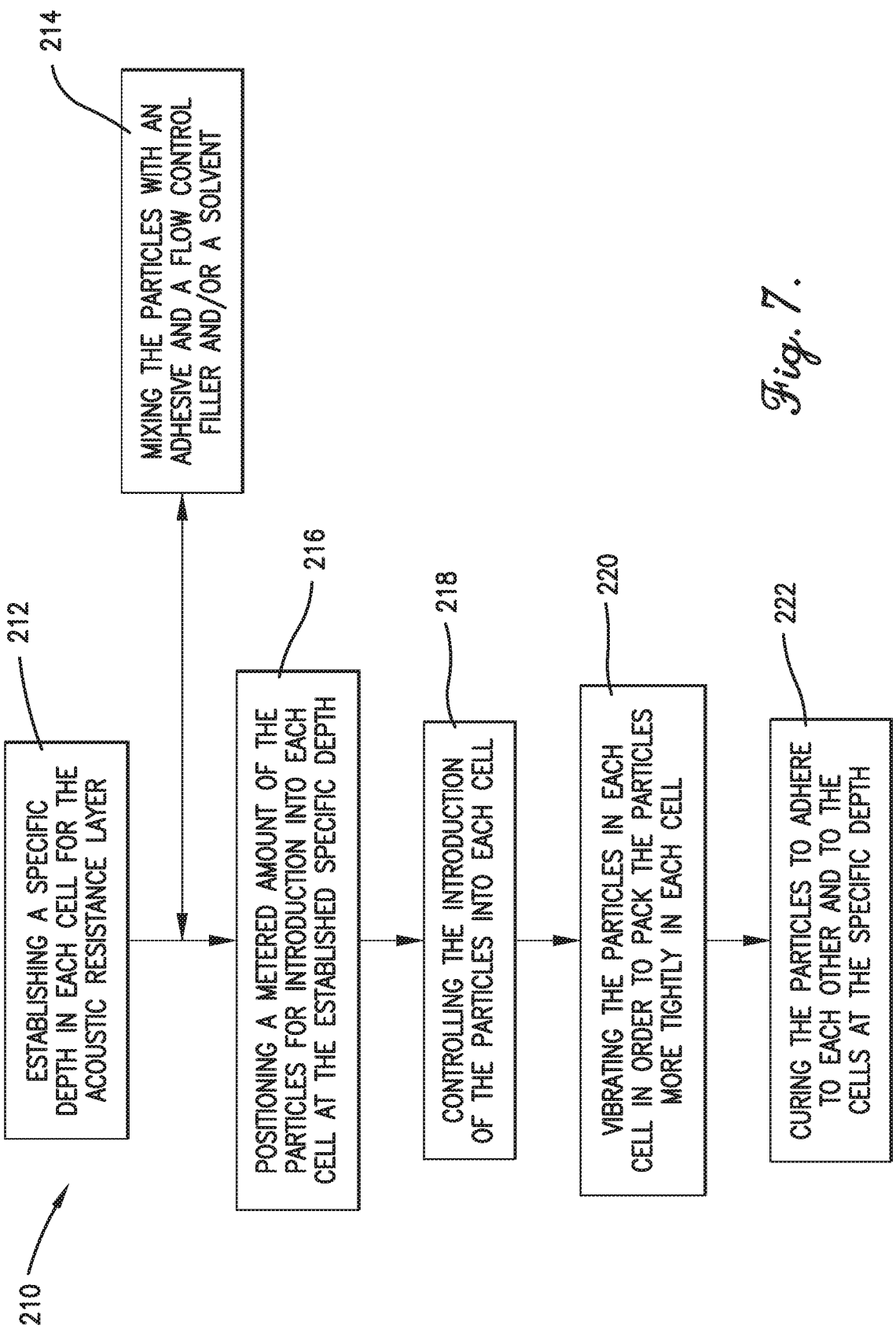
FIG. 7 is a flowchart of steps involved in an embodiment of a method of making the septum layer of FIG. 3.

Referring also to FIG. 7, the system 110 may operate substantially in accordance with the following method 210 for inserting the rounded particles 26 into the cells 22 to make the septum layer 24. The positioning mechanism 112 may be inserted into the cells 22 of the core 16 to the desired depth, as shown in 212. As needed or desired, the rounded particles 26 may be mixed with the adhesive 28, the flow control filler 30, and/or the solvent, as shown in 214. The metering mechanism 114 may be positioned over the gating mechanism 116 and aligned with the cells 22, and may be loaded with a desired amount of the rounded particles 26, as shown in 216. The metering mechanism 114 may be vibrated to better pack the rounded particles 26. The gating mechanism 116 may be withdrawn from between the cells 22 and the metering mechanism 114, thereby controlling the flow of the rounded particles 26 from the metering mechanism 114 into the cells 22, as shown in 218. The vibratory base 118 may vibrate the cells 22 to better pack the rounded particles 16, as shown in 220. At least the core 16 may be placed in an oven or other fixing mechanism to fix the rounded particles 26 and/or the adhesive 28 coating the rounded particles 26 and thereby securely fix the rounded particles 26 in each cell 22, as shown in 222.

Thus, it will be appreciated that embodiments of the present invention provide several advantages over the prior art, including making use of relatively inexpensive feedstock (compared to prior art woven mesh), making use of a more efficient mechanism for mass insertion and positioning (compared to the prior art cell-by-cell insertion process), requiring no vapor degreasing process or laser drill, and achieving relatively low non-linearity behavior.

Although the invention has been described with reference to the one or more embodiments illustrated in the figures, it is understood that equivalents may be employed and sub-

Having thus described one or more embodiments of the invention, what is claimed as new and desired to be protected by Letters Patent includes the following:

1. An acoustic septum for attenuating sound, the acoustic septum comprising:
   a core having a plurality of cells;
   an acoustic resistance layer including a plurality of spheres located at a particular depth in each cell, and providing linear acoustic resistance to a sound wave entering the cell;
   a metering mechanism configured to introduce a metered amount of the spheres into each cell, wherein the metering mechanism includes a plate having a plurality of holes, with each hole being alignable with a respective cell, such that spheres placed in the holes are introducible into the respective cells;
   a gating mechanism configured to control the introduction of the spheres from the metering mechanism into each cell, wherein the gating mechanism includes a single planar sheet selectively interposable between the holes of the metering mechanism and the cells, such that withdrawing the single planar sheet allows the spheres in the holes to move into the respective cells.

2. The acoustic septum of claim 1, wherein the spheres are between 100 microns and 700 microns in diameter.

3. The acoustic septum of claim 1, wherein the spheres are hollow.

4. The acoustic septum of claim 1, wherein the spheres have textured surfaces.

5. The acoustic septum of claim 1, wherein the spheres are made of syntactic foam.

6. The acoustic septum of claim 1, wherein the spheres are made of glass or ceramic.

7. The acoustic septum of claim 1, wherein the spheres are secured by an adhesive at the particular depth.

8. A system for adding an acoustic resistance layer to a plurality of cells of a core of an acoustic septum for attenuating sound, the acoustic resistance layer including a plurality of spheres, the system comprising:
   a positioning mechanism configured to be inserted into and positioned at a particular depth in each cell;
   a metering mechanism configured to introduce a metered amount of the spheres into each cell above the positioning mechanism, wherein the metering mechanism includes a plate having a plurality of holes, with each hole being alignable with a respective cell, such that spheres placed in the holes are introducible into the respective cells;
   a gating mechanism configured to control the introduction of the spheres from the metering mechanism into each cell, wherein the gating mechanism includes a single planar sheet selectively interposable between the holes of the metering mechanism and the cells, such that withdrawing the single planar sheet allows the spheres in the holes to move into the respective cells; and
   a vibratory base configured to vibrate the spheres in each cell in order to pack the spheres more tightly in each cell,
   wherein once the spheres are packed in each cell, the spheres are cured to adhere to each other and to the cells at the particular depth, and the positioning mechanism is removed.

9. The system of claim 8, wherein the spheres are coated to reduce agglomeration until the spheres have been introduced into the cells.

10. The system of claim 8, wherein the spheres are mixed with an adhesive.

11. The system of claim 8, wherein the spheres are mixed with a flow control filler.

12. The system of claim 8, wherein the spheres are mixed with a solvent which facilitates the introduction of the spheres into the cells and then evaporates.

13. The system of claim 8, wherein the positioning mechanism includes a platform configured to support the spheres at the particular depth.

14. The system of claim 13, wherein the platform has a chamfered edge which is adjacent to a wall of the cell when the platform is inserted into the cell, and wherein the chamfered edge results in the acoustic resistance layer being thicker adjacent to the wall of the cell.

15. The system of claim 13, wherein the platform is made of a wax material which is melted to remove the positioning mechanism from the cell.

16. The system of claim 13, wherein positioning mechanism includes a stem configured to support the platform.

* * * * *